United States Patent
Hasler et al.

(10) Patent No.: US 9,142,963 B2
(45) Date of Patent: Sep. 22, 2015

(54) MULTILEVEL CONVERTER AND A METHOD FOR CONTROLLING MULTILEVEL CONVERTER INCLUDING BALANCING CELL VOLTAGES

(71) Applicant: ABB Technology AG, Zurich (CN)

(72) Inventors: Jean-Philippe Hasler, Vasteras (SE); Mauro Monge, Vasteras (SE)

(73) Assignee: ABB Technology AG (CH)

( * ) Notice: Subject to any disclaimer, the term of this patent is extended or adjusted under 35 U.S.C. 154(b) by 0 days.

(21) Appl. No.: 14/252,274

(22) Filed: Apr. 14, 2014

(65) Prior Publication Data

US 2014/0218986 A1 Aug. 7, 2014

Related U.S. Application Data

(63) Continuation of application No. PCT/EP2011/067949, filed on Oct. 14, 2011.

(51) Int. Cl.
*H02M 3/24* (2006.01)
*H02J 3/18* (2006.01)
(Continued)

(52) U.S. Cl.
CPC ............... *H02J 3/1857* (2013.01); *H02J 3/26* (2013.01); *H02P 27/14* (2013.01); *H02M 2007/4835* (2013.01); *Y02E 40/26* (2013.01); *Y02E 40/50* (2013.01)

(58) Field of Classification Search
USPC .......................................... 363/3, 4, 7, 40, 95
See application file for complete search history.

(56) References Cited

U.S. PATENT DOCUMENTS

| 5,532,575 A | 7/1996 | Ainsworth et al. |
| 5,642,275 A | 6/1997 | Peng et al. |

(Continued)

FOREIGN PATENT DOCUMENTS

| WO | 2010115471 A1 | 10/2010 |
| WO | 2010145706 A1 | 12/2010 |

(Continued)

OTHER PUBLICATIONS

International Preliminary Report on Patentability Application No. PCT/EP2011/067949 Completed: Apr. 4, 2014 11 pages.

(Continued)

*Primary Examiner* — Adolf Berhane
*Assistant Examiner* — Gary Nash
(74) *Attorney, Agent, or Firm* — Whitmyer IP Group LLC

(57) ABSTRACT

A multilevel converter for controlling a multilevel converter is provided. The multilevel converter is a single phase converter with one phase leg, or a three phase converter with three phase legs, the phase legs of the three phase converter are interconnected in a star-configuration. The single phase converter with one phase leg, or each three phase converter with three phase legs, phase leg includes switching cells, and each switching cell includes semi-conductor switches arranged to selectively provide a connection to a corresponding energy storage element. The converter also includes a controller, which is provided to monitor the DC voltage of the energy storage elements, and the controller is provided to control the switching of each switching cell. The phase leg of the single phase converter, or each phase leg of the three phase converter, includes two parallel branches of switching cells, the branches being configured in a closed circuit.

15 Claims, 3 Drawing Sheets

(51) Int. Cl.
*H02J 3/26* (2006.01)
*H02P 27/14* (2006.01)
*H02M 7/483* (2007.01)

(56) References Cited

U.S. PATENT DOCUMENTS

| | | | |
|---|---|---|---|
| 6,075,350 A * | 6/2000 | Peng | 323/207 |
| 6,088,245 A | 7/2000 | Ainsworth | |
| 6,449,181 B1 * | 9/2002 | Rieger et al. | 363/159 |
| 7,423,892 B2 * | 9/2008 | Vinciarelli | 363/65 |
| 2007/0109823 A1 * | 5/2007 | Rastogi et al. | 363/40 |
| 2011/0141786 A1 | 6/2011 | Shen et al. | |

FOREIGN PATENT DOCUMENTS

| | | |
|---|---|---|
| WO | 2010145708 A1 | 12/2010 |
| WO | 2011088885 A1 | 9/2011 |

OTHER PUBLICATIONS

International Search Report and Written Opinion of the International Searching Authority Application No. PCT/EP2011/067949 Completed: Aug. 3, 2012; Mailing Date: Aug. 14, 2012 10 pages.

Makoto Hagiwara, et al.; "PWM Control and Experiment of Modular Multilevel Converters"; (c) 2008 IEEE; 8 pages.

Patent Examination Report No. 1 from Australia Application No. 2011379032 Issued: Jan. 12, 2015 3 pages.

* cited by examiner

MULTILEVEL CONVERTER AND A METHOD FOR CONTROLLING MULTILEVEL CONVERTER INCLUDING BALANCING CELL VOLTAGES

FIELD OF THE INVENTION

The invention relates to multilevel converters that are used in electrical power systems to exchange power, and which includes switching cells consisting of semiconductor switching circuits and energy storage elements, such as capacitors. Especially, the invention relates to multilevel inverters having a single phase or multilevel inverters having three phases that are star- or wye-connected, and which multilevel inverter is equipped with means arranged and adapted to counteract DC unbalances in such single phase or wye-connected three phase multilevel converters.

BACKGROUND OF THE INVENTION

The invention relates to the field of voltage source converters and especially multilevel converters. Voltage source converters (VSC) have changed power transmission and distribution and using power electronics including semiconductor switching elements that can be turned off, such as IGBTs (Insulated Gate Bipolar Transistors) have found great use for DC transmission, reactive power compensation, control of active as well as reactive power, being able to create AC voltage out of DC voltage by means of switching control, and for converting AC to DC etcetera.

The multilevel converter technique, employing many voltage levels, wherein each voltage level being individually switched, can be used to create AC voltage from DC in small voltage steps providing a stepped voltage curve much closer to a sinus curve than the previous use of two level and three level converters. Often, the energy storage means used consists of capacitors but may also be batteries.

A problem that may arise is that voltages over individual energy storage means become too large or too low.

U.S. Pat. No. 5,532,575 (D1) describes a multilevel converter with means for balancing voltages of capacitors of the converter. D1 describes a multilevel converter primarily intended for use as a static VAr compensator (column 1, line 5-8). The multilevel converter includes three legs, one for each phase, of switching elements (GTO's 30, see FIG. 1), which switching elements (GTO's) are connected to tapping points of capacitors 20 (column 1, line 28-34). The multilevel converter also includes a control system 60 (column 7, line 48-65) that controls the switching of the GTO's. The control system monitors the voltages of the capacitors and (see column 8 line 32-64) if a voltage level of a capacitor is too high or too low, the control system (see abstract) adjusts the timing of the switching of those capacitors that have too low or too high voltage level, but do not change the switching timing of those capacitors that do not deviate. In this way the voltages of those capacitors that do not deviate is not affected (column 8, line 39), whereas the voltages of the deviating capacitors are balanced.

A document that describes a similar topology and switching control in a multilevel converter for a different purpose is U.S. Pat. No. 6,088,245 (D2). D2 describes a switching control arrangement for multilevel converters that counteract the harmonic content of the converter voltage or current by controlling the switching pattern of the switching devices, e.g. GTO's (see abstract). Especially, the switching pattern is changed by modifying the timing of the switching of the switching devices.

Thus, documents D1 and D2 describe two different goals achieved by adjusting the timing of the switching of the switching devices of a multilevel converter, i.e. balancing capacitor voltages and reducing harmonics, respectively. In the multilevel converters described in D1 and D2, the three phases have common energy storage elements, i.e. the three phase share capacitors.

Another known type of multilevel converters, are converters having a semiconductor switching element in a switching cell circuit having a half bridge or full bridge configuration. For example, two IGBTs are used in each switching cell in a half bridge configuration with a DC capacitor as energy storage element, and each IGBT is arranged in anti-parallel with its own diode.

In such multilevel converters that have separate energy storage elements for each phase, e.g. capacitors that belong to one phase, sharing of energy between the capacitors within a phase leg, or between capacitors of different phase legs, is difficult to achieve without affecting the power that is transferred to the power network.

Document WO2010/145706 (D3) provides a solution for balancing voltages of the energy storage elements of a delta connected multilevel converter, having serially connected switching cells with a corresponding energy storage element, arranged in three phase legs. In more detail, D3 describes a multilevel converter having delta connected phase legs and wherein the DC voltages of the switching cells of each of the phase legs are balanced by means of a balancing current circulating between the phase legs, and distributing energy between the energy storage elements of the phase legs. D3 describes an arrangement for exchanging power in a shunt connection with a three phase power network, which arrangement comprises a voltage source converter having three phase legs in a delta connection, wherein each leg comprises a series of switching cells (see abstract of D3). The electrical conditions of the three phases of the power network and the converter are measured and a control unit (19) is configured to determine if the phases are unbalanced. The control unit (19) determines a zero sequence current that indicates such an unbalance and uses this determined zero sequence current to control the switching cells to add a circulating current to the currents in the phase legs to counteract such an unbalance (see claim 1 of D3). The circulated current is driven inside the delta of the converter legs and moves energy inside the delta, between the legs without negatively affecting the power network, and avoids creating harmonics in the power network (see D3 page 4, lines 24-29).

In such a delta connected multilevel converter the phase legs handle the phase voltage and comprise a sufficient number of levels to handle the voltage level between the phases. A multilevel converter having phase legs connected in a star- or wye-topology would only need a sufficient number of levels to handle the line voltage between ground and the phase. Thus, a disadvantage with a delta topology compared to a wye-topology is that the number of levels needed is larger for handling the higher voltage differences. On the other hand, a disadvantage of making a wye connected converter legs in a multilevel converter having switching cells and corresponding energy storing elements is that using currents to move energy between the energy storing elements affects the power transmission network, since the three legs do not provide a closed circuit as in a delta connected multilevel converter.

SUMMARY OF THE INVENTION

It is an object of the invention to overcome the shortcomings of the prior art and provide a multilevel converter with wye connected phase legs being able to move energy between energy storage devices of the phase legs to balance the voltage levels of individual energy storage elements without negatively affecting the power transmission network by, for example, introducing harmonics.

It is also an object to provide a single phase converter, wherein the voltage levels of the energy storage elements of the switching cells can be balanced without affecting the power transmission.

It is therefore an object of the invention of creating a multilevel converter with a single phase leg or three phase legs comprising serially connected switching cells and accompanying energy storage elements, which three phase legs are connected in a star- or wye-connection, wherein balancing of the voltage levels in the energy storage elements can be provided without affecting the energy transfer between the multilevel converter and the transmission network to which the multilevel converter are connected, or provided to be connected.

For these purposes, the present invention provides a multilevel converter being:

a single phase converter with one phase leg, or a three phase converter with three phase legs being interconnected in a star- or wye-configuration; wherein the phase leg, or each phase leg, comprises switching cells in many levels, e.g. more than three levels, each switching cell comprises semi-conductor switching elements, such as IGBTs, arranged to selectively provide a connection to a corresponding energy storage element, preferably at least one dedicated storage element per switching cell. The converter also includes a controller, which is provided to monitor the DC voltage of the energy storage elements, and the controller is provided to control the switching, by means of firing commands to semiconducting switches of the cells. The multilevel converter is characterized in that: the phase leg of the single phase converter, or each phase leg of the three phase converter, comprises two parallel branches of serially connected switching cells, and which the branches are configured in a closed circuit.

Preferably, each phase leg comprises a phase connection for connection to a power network, each branch having an end at the phase connection, and the branches being interconnected at the phase connection. Each phase leg of the three phase converter also comprises a neutral connection, preferably to a neutral floating ground or alternatively the neutral is connected to ground, and the branches are interconnected at the neutral connection, so that a closed circuit is created by the neutral, the first branch, the phase connection and the second branch.

The single phase leg preferably comprises a ground connection where the two branches are joined, providing a closed circuit from ground, through the first branch, the phase connection, through the second branch back to the ground connection.

Having to parallel branches in every phase leg makes it possible to balance the voltages of the energy storage devices in each phase by means of circulating a current in the two branches of the phase leg without affecting the power that is supplied to the power network.

In a preferred embodiment, the converter is adapted to monitor the voltage levels of each energy storage element and is adapted to transfer energy between the energy storage devices by controlling the switching of the switching cells in dependence of the voltage levels to compensate for voltage unbalances. More preferably, the controller is adapted to create a circulating current ($I_0$) in the branches of each phase leg for effectuating the energy transfer.

In an embodiment, the circulating current is created as an idle current and is kept circulating also when no unbalances exist. The circulating current is created by means of switching the switching cells, and the transfer of energy being effectuated by individually varying the switching of the switching cells. Especially, the controller is adapted to effectuate the transfer of energy by individually varying the switching of the switching cells, and keeping the circulating current circulating simultaneously.

Preferably, the multilevel converter is adapted to supply power to a power network and is adapted to maintain the supply of power during transfer of energy to compensate for voltage unbalances. The power network is a transmission or distribution network. Thus, by circulating current in the branches, the power supplied to the network remains unaffected during the energy balancing being performed. Preferably also, the current supplied to the power network is monitored and also the circulating current is monitored by means of monitoring the current of each branch of each phase leg, or the current of each branch of the single phase leg.

In an embodiment, the converter is a three phase converter which phase legs of the three phase converter are star-connected (or "wye-connected"), and especially the three phases have a floating neutral point without grounding connection.

Alternatively, in another also preferred embodiment, the converter is a single phase converter being adapted for rail way application, especially being arranged at a rail way for power conversion in a rail way application.

Two phase multilevel converters are also envisaged having two phase legs, each having two branches, and each having a phase connection, the two phase legs being joined at a neutral ground at the respective opposite end of each phase leg, and the branches of each leg being interconnected at the phase connection and at the neutral ground providing a closed circuit so that a circulating current can be provided in each phase leg which is utilized for transferring energy and thereby balance the energy storage elements of the switching cells.

In an embodiment, the energy storage devices are capacitors, or the energy storage devices of a majority of the switching cells of each branch are capacitors and at least one being a battery.

Alternatively, the energy storage devices are batteries, or at least a majority of the energy storage devices are batteries.

In an embodiment, each switching cell comprises a full H-bridge with four semiconductor switching elements, preferably IGBTs, connected to the energy storage element.

In an alternative embodiment, each switching cell comprises a half-bridge with four semiconductor switches, preferably IGBTs, connected to the energy storage element (52).

The invention also provides a method for controlling a multilevel converter having either one single phase or three phases, the multilevel converter comprising one phase leg, or three phase legs interconnected in a star-configuration. The, or each, phase leg comprises switching cells in more than three levels, each switching cell comprising semi-conductor switches arranged to selectively provide a connection to a corresponding energy storage element, at least one dedicated storage element per switching cell. The method includes monitoring the voltage levels of each of the energy storage elements, and the multilevel converter comprises two parallel branches of switching cells in the, or each, phase leg, which branches are configured in a closed circuit, and the method is characterized in balancing the voltages of the energy storage elements, and wherein the balancing includes circulating a current within the two branches.

In an embodiment, the multilevel converter, further includes supplying a current ($I_1$) to a power network. Preferably, the supplying of a current ($I_1$) to the network being maintained and unaffected during the balancing. Basically, the control signals to the switching cells are adapted so that the supplied current ($I_1$) and the circulating current ($I_0$) are superimposed.

In an embodiment, the method further includes creating a circulating current (I0) in the two branches, and the balancing includes modifying the circulated current (I0) to transfer energy between the storage elements of at least two switching cells. Especially, the balancing is performed upon detecting, during the monitoring of voltages that at least one voltage deviates. A fast balancing can be achieved by circulating a current during normal operation and when unbalances occur the switching is adjusted whereby the circulating current is adjusted to balance the energy storage elements by a net transfer of energy to or from the deviating element.

BRIEF DESCRIPTION OF THE DRAWINGS

The invention will in the following be described in more detail with reference to the accompanying drawings, which are illustrating the invention for facilitating performing the invention and therefore are simplified. The figures are not drawn to scale.

DETAILED DESCRIPTION OF THE INVENTION

Figure 1:
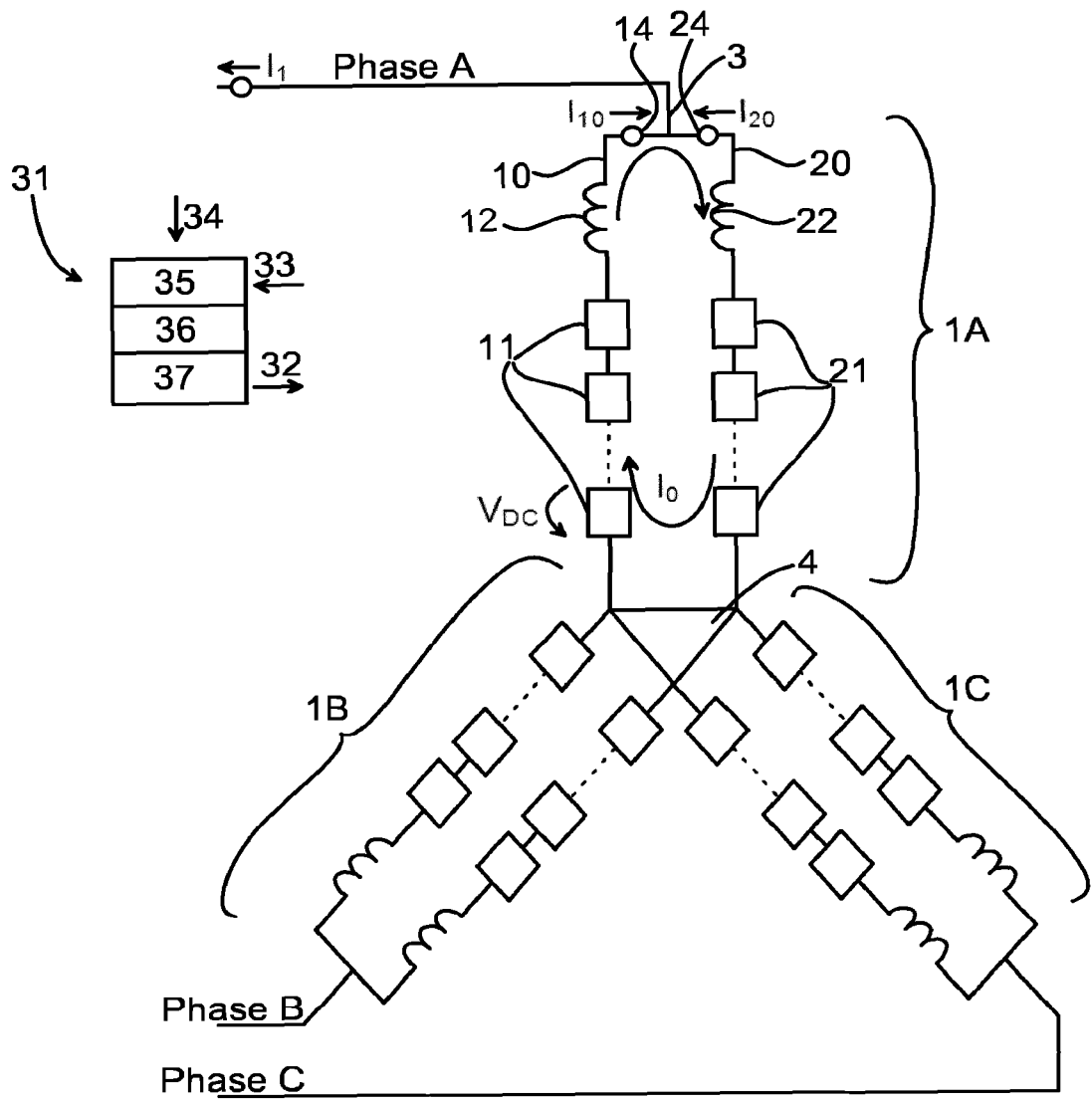
FIG. 1 illustrates a three phase multilevel voltage source converter in accordance with the invention.

FIG. 1 illustrates an embodiment of a multilevel converter according to the invention. The multilevel converter of this embodiment is adapted for connecting to a three phase system and comprises three legs 1A, 1B, 1C, one leg for each phase A B C, which legs are connected together in a star- (or wye-) configuration. Each phase leg 1A-C has one end 3 for connection to a corresponding phase A-C of a power network, and each phase leg 1A-C has an opposite end connected to a common neutral ground point 4, i.e. the phase legs 1A-C share a common ground. The neutral ground point 4 is a floating ground and is not connected to the ground.

Each phase leg, for example 1A, consists of two branches, for example 10, 20. For clarity only the reference numerals for phase leg 1A for phase A have been added to the figure, but phases leg 1B and 1C includes the same objects as phase leg 1A. The two branches 10, 20, of each phase leg 1A-C are interconnected in its ends, at the first end 3 facing the power network and in the second opposite end facing the neutral point 4. Each branch comprises a series of switching cells 11, 21. Each branch 10, 20 extends from the neutral 4 to the phase connection 3, where the two branches of each phase leg 1A-C are joined. Each branch of each phase leg is also provided with a reactor 12, 22 arranged at the first end towards the phase connection 3. Each reactor 12, 22 functions as a smoothening reactor 12, 22 to even out the voltage steps of the power from the branches 10, 20 of each phase leg 1A-C.

The converter also includes a controller 31 operatively connected to the phase legs, especially operatively connected (indicated by arrows 32, 33) to the switching cells 11, 21 and includes means 33 for receiving information from and means 32 for transferring control signals to each switching cell 11, 21 individually. The controller 31 is adapted for monitoring the voltage ($V_{DC}$) of each switching cell 11, 21 and adapted for controlling 32 the switching of each cell 11, 21. The controller 31 is also arranged to monitor 34 the power network, especially monitoring the phase voltages and phase currents.

The controller 31 is adapted to control each phase leg to supply a current $I_1$ to the power network by means of switching commands 32 transferred to the switching cells. The controller is also adapted to control the phase legs (of each phase) to create a circulating current $I_0$ in the phase leg, which circulating current circulates in both branches, from branch to branch via the neutral connection 4 and the phase connection 3, without contributing to the phase current $I_1$.

The controller comprises a combination of hardware and software to perform its functions including receiving and transferring signals, analysing the signals and determine voltage levels and whether a voltage level deviates from nominal ranges. For illustrating the main characteristics of the invention, the controller 31 is simplified in the FIGS. 1 and 2. The controller 31 is exemplified as including a current and voltage monitoring part 35, an analysing part 36 and a switching cell controlling part 37. The controller 31 receives 34 the phase voltages and currents in the power network by means of the monitoring part 35. The controller 31 also receives 33 the cell voltages and currents in each branch of the converter legs by means of the monitoring part 35. The analyser 36 determines if an adjustment is needed, in which case the controller 31 starts transferring energy between the energy storage elements 11, 21. The controller 31 performs the switching cells by means of the switching controller 37, and if at least one voltage should be adjusted, the switching controller 37 adjusts the switching signals that are transferred to at least one of the switching cells 11, 21.

The monitoring includes measuring the capacitor voltage $V_{DC}$ of each switching cell 11, 21, and the currents created in each phase leg branch $I_{10}$ and $I_{20}$ respectively. From the measured currents $I_{10}$, and $I_{20}$, the controller 31 is adapted to determine the current $I_1$ provided to the phase A-C of each respective phase leg 10, 20, and also the circulating current $I_0$. Each phase leg includes means for monitoring the voltages and currents, such as current transformers 14, 24 for monitoring each of the branch currents $I_{10}$, $I_{20}$, and voltage transformers for monitoring each voltage level $V_{DC}$ of each energy storage element. The power exchange with the power network is monitored by means of voltage and current measuring devices such as current transformers for measuring the phase currents $I_1$ of each of the phases and voltage transformers (not illustrated) for measuring the phase voltages.

Figure 2:
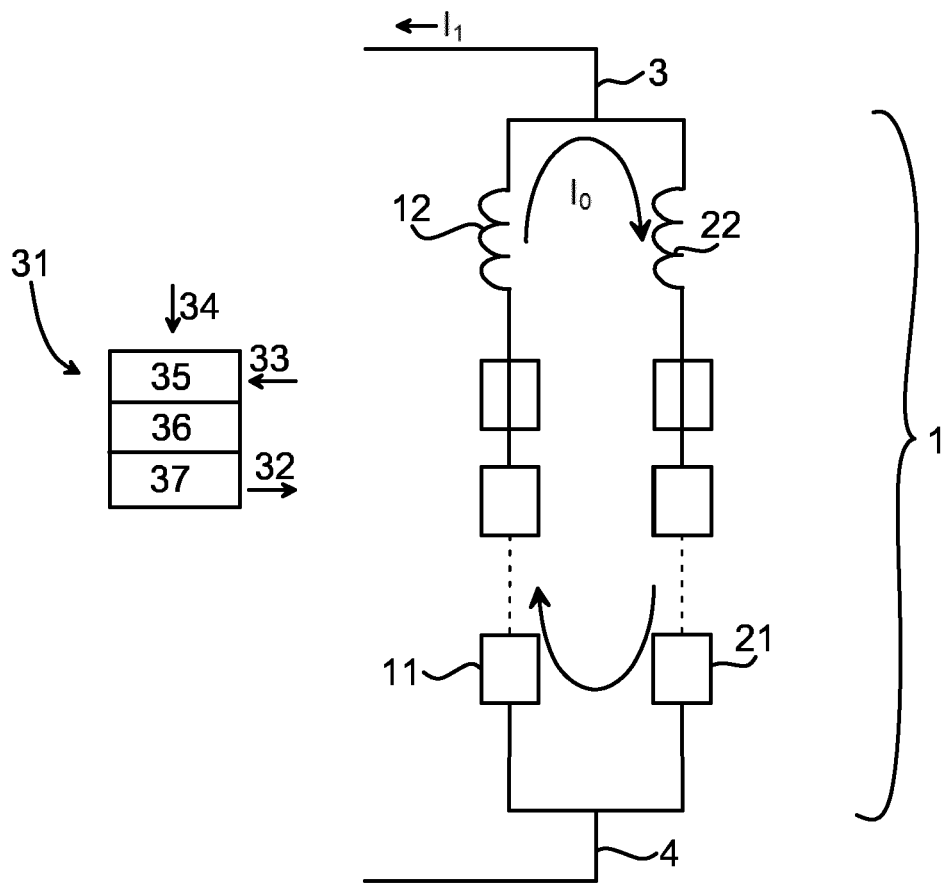
FIG. 2 illustrates a single phase multilevel voltage source converter in accordance with the invention.

FIG. 2 illustrates a one phase multilevel converter comprising one single phase leg 1, which phase leg has the same topology as each of the three phase legs of the three phase converter of FIG. 1. Thus, the single phase leg comprises two branches 10, 20, each branch comprising serially arranged switching cells 11, 21. Each switching cell being individually controlled by a controller 31, said controller is provided with means for monitoring 33 and controlling 32 the converter, especially controlling the switching of the switching cells 11, 21, so as to create a phase current $I_1$ supplied to the power network and for creating a circulating current $I_0$ that is not supplied to the power network and instead circulates in the two branches 10, 20 of the single phase leg 1. Each branch 10, 20 of the phase leg 1 also includes a reactor 12 and 22, respectively, which reactor 12, 22 is arranged in the network end of the corresponding branch.

The controller 31 of FIG. 2 corresponds to the controller of FIG. 1 and comprises a combination of hardware and software to perform its functions including receiving and transferring signals, analysing the signals and determine voltage levels and whether a voltage level deviates from nominal ranges. The controller 31 receives 34 the voltage and current in the power network by means of the monitoring part 35. The controller 31 also receives 33 the cell voltages (VDC) and currents in each branch of the converter leg 1 by means of the monitoring part 35. The analyser 36 determines if an adjustment is needed, in which case the controller 31 starts transfer of energy between the energy storage elements 11, 21. The controller 31 performs the switching cells by means of the switching controller 37, and if at least one voltage should be adjusted, the switching controller 37 adjusts the switching signals that are transferred to at least one of the switching cells 11, 21.

Figure 3A:
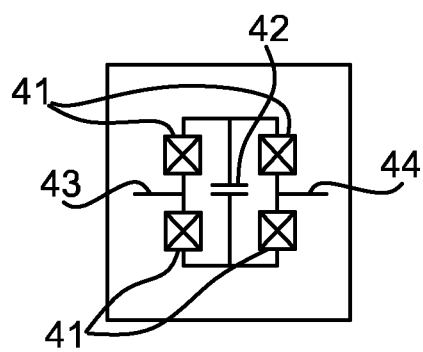
FIGS. 3A and 3B illustrate switching circuits including semiconductor switching elements, such as IGBTs, and energy storage devices in the form of capacitors.
Figure 3B:
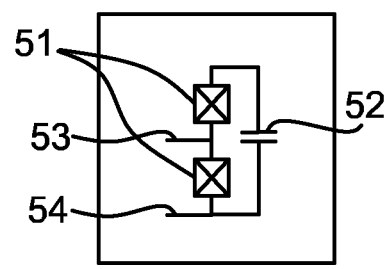

FIGS. 3*a* and 3*b* illustrate two embodiments of switching cells (11, 21) and corresponding energy storage elements that are suitable for any of the multilevel converter arrangements of FIGS. 1 and 2.

FIG. 3*a* illustrates a H-bridge (also referred to as a full bridge) switching cell. The H-bridge switching cell includes four IGBTs 41 including freewheeling diodes in anti-parallel relationship to each respective IGBT. Each cell includes input and output terminals 43, 44 for serial connection of switching cells to make up a branch of serially connected switching cells. A capacitor 42 is arranged as energy storage element, which is selectively connected to the input and output terminals 43, 44 by means of the IGBTs.

FIG. 3*b* illustrates a half bridge (also referred to as a half H-bridge) switching cell. It includes a capacitor 52 as energy storage element and two IGBTs 51 for selective connection of the energy storage element 52 to the terminals 53, 54 of the half bridge switching cell. Each switching cell of FIGS. 3*a* and 3*b* comprises its own energy storage element 42, 52, the voltage of which is monitored for deviations and subsequently adjusted by means of change of the switching signal pattern.

Figure 4:
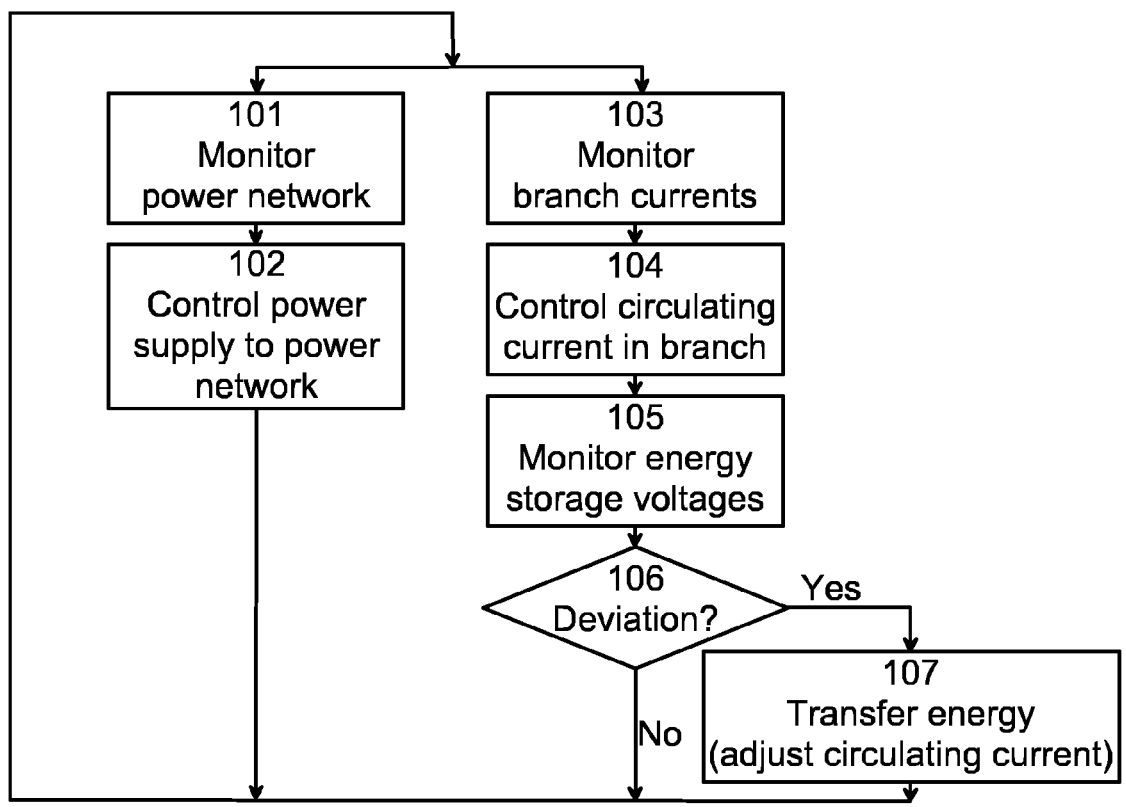
FIG. 4 illustrates a method for controlling a multilevel converter according to the invention.

FIG. 4 illustrates a method for controlling a multilevel converter. The method is mainly intended for balancing the DC voltages of the switching cells of the three phase multilevel converter illustrated in FIG. 1 and the single phase multilevel converter of FIG. 2. The method includes primarily two main functions illustrated as two parallel sequences. The method includes a first sequence including controlling the multilevel converter to interact with the power network by supplying power to the network, in steps 101-102, and a second sequence including adjusting the DC voltages of the energy storage elements, in steps 103-106.

Especially, the method of the invention includes monitoring 105 the voltages of each energy storage element, and as a response to the monitoring transferring 107 energy to, or from, an energy storage element whose voltage level deviates from predetermined voltage levels. In this way the voltage level of every energy storage element can be kept within suitable limits. A main function of the multilevel converter is to interact with the power network; steps 101 and 102 describe this interaction. The method interacts with the power network by monitoring the power network, in step 101, which includes monitoring the voltage and current of each phase and especially includes monitoring the power supplied to the network. Also, the interaction includes, in step 102, controlling the power that is supplied from the converter to the power network.

The other main function includes the balancing of the DC voltages of the energy storage elements of the switching cells. This balancing function is provided by monitoring the voltage levels of the energy storage elements in step 105, determining if any of the voltage levels deviates from a nominal voltage level in step 106, and if one or more of the voltage levels deviate more than a predefined threshold, the method includes the step of transferring energy to or from the deviating energy storage element in step 107. This balancing is performed without interacting with the power network, so the balancing is performed without affecting the supply to the power network. Instead of affecting the interaction with the power network steps 101, 102 of the method include monitoring and controlling respectively the interaction with the power network and maintaining the supply to the power network. Thus, the energy being transferred in step 107 is transferred only in the branches within each phase leg and do not enter into anyone of the phases of the power network. The embodiment of the method in FIG. 4 also includes monitoring the currents in the branches of each leg in step 103, especially monitoring that the energy being transferred by a current in the branches circulates in the closed circuit provided by the two branches of each phase leg. In step 104 the method includes controlling the switching elements to create and provide a circulating current in the two branches of each phase leg. This circulating current may suitably be provided as an idling current circulating in the branches, without adding or subtracting energy from any of the storage elements unless any of the storage elements should be balanced, i.e. upon detecting that an energy storage element deviates and, as a response to the detected deviation, balancing the energy storage element in question. The energy transfer step 107 is performed by adjusting the already circulating current to add or remove energy from a deviating switching cell so that the voltage levels of the energy storage elements are balanced.

The invention has been described mainly by a single phase and a three phase converter embodiment, and how voltage levels over individual energy storage means can be kept within limits so that they do not become too large or too low. The invention can be used for adjusting voltage unbalances in a wide range of different multilevel converters acting for controlling transmission and distribution of electric power in networks, especially in multilevel converters that utilize switching cells with dedicated energy storage elements for controlling the power transmission and distribution. Such multilevel converters may be used for providing functions including, but not limited to, DC transmission, controlling active and/or reactive power, such as reactive power compensation, or for converting AC to DC and DC to AC.

What is claimed is:

1. A multilevel converter comprising:
   a single phase converter with one phase leg connected to a power network, or a three phase converter with three phase legs each connected to the power network, the phase legs of the three phase converter being interconnected in a star-configuration,
   the single phase converter with one phase leg, or each three phase converter with three phase legs having switching cells, each switching cell having semi-conductor switches arranged to selectively provide a connection to a corresponding energy storage element,
   the converter also includes a controller, which is provided to monitor the DC voltage of the energy storage elements,
   the controller is provided to control the switching of each switching cell, wherein the phase leg of the single phase converter, or each phase leg of the three phase converter, comprises two parallel branches of switching cells, the branches being configured in a closed circuit;
   wherein the controller is adapted to monitor the voltage levels of each energy storage element and to monitor phase voltages and phase currents of the power network, the controller transferring energy between the energy storage elements by controlling the switching of the switching cells in dependence of the voltage levels of each energy storage element to compensate for voltage unbalances the switching of the switching cells in each of the two branches causing a circulating current in the two branches without contributing to the phase current of the phase leg.

2. The multilevel converter according to claim 1, wherein the controller is adapted to create a circulating current in the branches of each phase leg for effectuating the energy transfer.

3. The multilevel converter according to claim 2, wherein the controller is adapted to effectuate the transfer of energy by individually varying the switching of the switching cells.

4. The multilevel converter according to claim 1, being adapted to supply power to a power network and being adapted to maintain the supply of power during the transfer of energy to compensate for voltage unbalances.

5. The multilevel converter according to claim 1, wherein the converter is a three phase converter which phase legs are star-connected, and includes a floating neutral point.

6. The multilevel converter according to claim 1, wherein the converter is a single phase converter being adapted for rail way application, especially being arranged at a rail way for rail way application.

7. The multilevel converter according to claim 1, wherein the energy storage device of at least one switching cell is a capacitor.

8. The multilevel converter according to claim 1, wherein each switching cell comprises a full H-bridge with four semiconductor switching elements.

9. The multilevel converter according to claim 1, wherein each switching cell comprises a half-bridge with four semiconductor switching elements.

10. The multilevel converter according to claim 1, wherein each phase leg of either the single phase converter or the three phase converter further comprises a reactor series connected to each of the two parallel branches of switching cells.

11. A method for controlling a multilevel converter having a single or three phases, the multilevel converter including one phase leg, or three phase legs interconnected in a star-configuration, the one phase leg, or each of three phase legs having switching cells, each switching cell having semi-conductor switches arranged to selectively provide a connection to a corresponding energy storage element, the method including the steps of:
  monitoring the voltage levels of each of the energy storage elements, wherein
  the one phase leg, or each of three phase legs of the multilevel converter having two parallel branches of switching cells, wherein the branches are configured in a closed circuit and the method further includes the step of:
  balancing the voltages of the energy storage elements by circulating a current within the closed circuit of the two branches of the one phase leg, or each of the three phase legs without contributing to the phase current of the phase leg by controlling the switching of the switching cells in dependence of the voltage levels of each energy storage element to compensate for voltage unbalances.

12. The method for controlling a multilevel converter according to claim 11, further including supplying a current to a power network.

13. The method for controlling a multilevel converter according to claim 12, wherein the supplying of a current to the power network is maintained during the balancing.

14. The method for controlling a multilevel converter according to claim 11, further including creating a circulating current in the two branches, and wherein the balancing includes modifying the circulated current to transfer energy between the storage elements of at least two switching cells, especially upon detecting, during the monitoring of voltages, that at least one voltage deviates.

15. The method for controlling a multilevel converter according to claim 11, further comprising the step of evening out voltage steps of power from each of the two parallel branches of switching cells for each phase leg of either the single phase converter or the three phase converter.

* * * * *